United States Patent
Martignon

(10) Patent No.: US 6,782,681 B2
(45) Date of Patent: Aug. 31, 2004

(54) APPARATUS FOR ADJUSTING THE HEIGHT OF A TOOL SUCH AS A LAWNMOWER, PARTICULARLY FOR GARDENING VEHICLES

(75) Inventor: Girolamo Martignon, Borgoricco (IT)

(73) Assignee: Antonio Carraro S.p.A., Campodarsego (IT)

( * ) Notice: Subject to any disclaimer, the term of this patent is extended or adjusted under 35 U.S.C. 154(b) by 0 days.

(21) Appl. No.: 10/201,975

(22) Filed: Jul. 25, 2002

(65) Prior Publication Data

US 2003/0024226 A1 Feb. 6, 2003

(30) Foreign Application Priority Data

Aug. 3, 2001 (IT) .................................... PD2001A0197

(51) Int. Cl.[7] ............................................. A01D 34/64
(52) U.S. Cl. ....................................................... 56/14.7
(58) Field of Search ............................... 56/14.7, 15.8, 56/15.9

(56) References Cited

U.S. PATENT DOCUMENTS

| | | | | |
|---|---|---|---|---|
| 2,972,850 A | * | 2/1961 | Ariens et al. ................. | 56/15.6 |
| 3,041,810 A | * | 7/1962 | Roberts et al. ............... | 56/14.7 |
| 3,166,880 A | * | 1/1965 | Robinson ......................... | 56/6 |
| 3,199,276 A | * | 8/1965 | Hahn ........................... | 56/255 |
| 3,686,840 A | * | 8/1972 | Root ........................... | 56/15.8 |
| 4,102,114 A | * | 7/1978 | Estes et al. ................... | 56/15.2 |
| 4,320,616 A | * | 3/1982 | Marto ........................... | 56/15.3 |
| 4,441,306 A | | 4/1984 | Kuhn | |
| 4,760,686 A | * | 8/1988 | Samejima et al. ............. | 56/15.8 |
| 4,835,952 A | * | 6/1989 | McLane ........................ | 56/17.2 |
| 4,869,057 A | * | 9/1989 | Siegrist ........................ | 56/15.9 |
| 4,962,636 A | * | 10/1990 | Sampei et al. ................ | 56/17.1 |
| 5,065,568 A | | 11/1991 | Braun et al. | |
| 5,079,926 A | * | 1/1992 | Nicol .......................... | 56/12.7 |
| 5,816,033 A | * | 10/1998 | Busboom et al. ............. | 56/10.8 |
| 6,205,754 B1 | * | 3/2001 | Laskowski .................... | 56/15.1 |

FOREIGN PATENT DOCUMENTS

| | | |
|---|---|---|
| EP | 1 068 786 | 1/2001 |
| FR | 2 469 867 | 5/1981 |

* cited by examiner

*Primary Examiner*—Thomas B. Will
*Assistant Examiner*—Alicia Torres
(74) *Attorney, Agent, or Firm*—Guido Modiano; Albert Josif; Daniel O'Byrne

(57) ABSTRACT

Apparatus for adjusting the height of a tool particularly for gardening vehicles, comprising front wheels whose height can be adjusted on corresponding supports that are rigidly coupled, at the front, to a housing suitable to form the chassis of the tool, the apparatus comprising:

a rear linkage, which is articulated in a lower region with respect to the protective housing of the tool, a crank arranged above the housing along the tool advancement direction, with a front end articulated above the housing and a rear end articulated to the upper end of the linkage, which is rigidly coupled to a support articulated to the chassis of the vehicle, the articulation points of the linkage and the crank and the common axis of rotation of the wheels providing the joints of an articulated quadrilateral constituted by the housing, the linkage, the crank and the wheel supports.

10 Claims, 5 Drawing Sheets

APPARATUS FOR ADJUSTING THE HEIGHT OF A TOOL SUCH AS A LAWNMOWER, PARTICULARLY FOR GARDENING VEHICLES

BACKGROUND OF THE INVENTION

The present invention relates to an apparatus for adjusting the height of a tool such as a lawnmower or the like, particularly for gardening vehicles.

As is known, vehicles are currently used, especially in the field of small or large garden maintenance, which can have a structure that is dedicated to a specific function and therefore are only lawnmowers, or can be constituted by a tractor that supports tools interchangeably.

In the particular case of lawnmower tools, the tools are constituted by a protective housing, which acts as a chassis, supports a plurality of blades arranged substantially horizontally, and is provided with four wheels whose height can be adjusted in order to consequently adjust the height of said housing from the ground, determining the cutting height.

The housing is associated with a supporting arm, in which one end is articulated to the vehicle and one end is rigidly coupled to the housing.

Although having a widespread use, these tools of the lawnmower type are not devoid of drawbacks.

Particular difficulty is in fact encountered in adjusting the height of the housing from the ground in order to determine the cutting height of the tool.

The adjustment is in fact performed by acting on each wheel, one at a time.

The operation is therefore particularly slow and complicated.

SUMMARY OF THE INVENTION

The aim of the present invention is to provide an apparatus particularly for adjusting the height of tools such as lawnmowers or the like for gardening vehicles that solves the drawbacks of conventional lawnmower tools.

Within this aim, an object of the invention is to provide an apparatus that allows quick adjustment of the height of the tool.

Another object is to provide an apparatus that can be used even by users lacking particular technical knowledge.

Another object is to provide an apparatus that has a simple structure.

Another object is to provide an apparatus that has a low cost and can be manufactured with conventional equipment and technologies.

This aim and these and other objects that will become better apparent hereinafter are achieved by an apparatus for adjusting the height of a tool such as a lawnmower particularly for gardening vehicles, of the type that comprises front wheels whose height can be adjusted on corresponding supports that are rigidly coupled, at the front, to a protective housing suitable to form a chassis of said tool, characterized in that it comprises:

a rear linkage, which is articulated in a lower region with respect to said protective housing of the tool, a crank whose length can be adjusted by a user, said crank being arranged above the housing along the tool advancement direction, with a front end that is articulated in an upper region with respect to said housing and a rear end that is articulated to an upper end of said rear linkage;

said linkage being rigidly coupled to a support that is articulated to the chassis of said vehicle, articulation points of said linkage and said crank and a common axis of rotation of said wheels providing joints of an articulated quadrilateral constituted by said housing, said linkage, said crank and said supports.

BRIEF DESCRIPTION OF THE DRAWINGS

Further characteristics and advantages of the present invention will become better apparent from the following detailed description of a preferred but not exclusive embodiment thereof, illustrated only by way of non-limitative example in the accompanying drawings, wherein.

DESCRIPTION OF THE PREFERRED EMBODIMENTS

Figure 1:
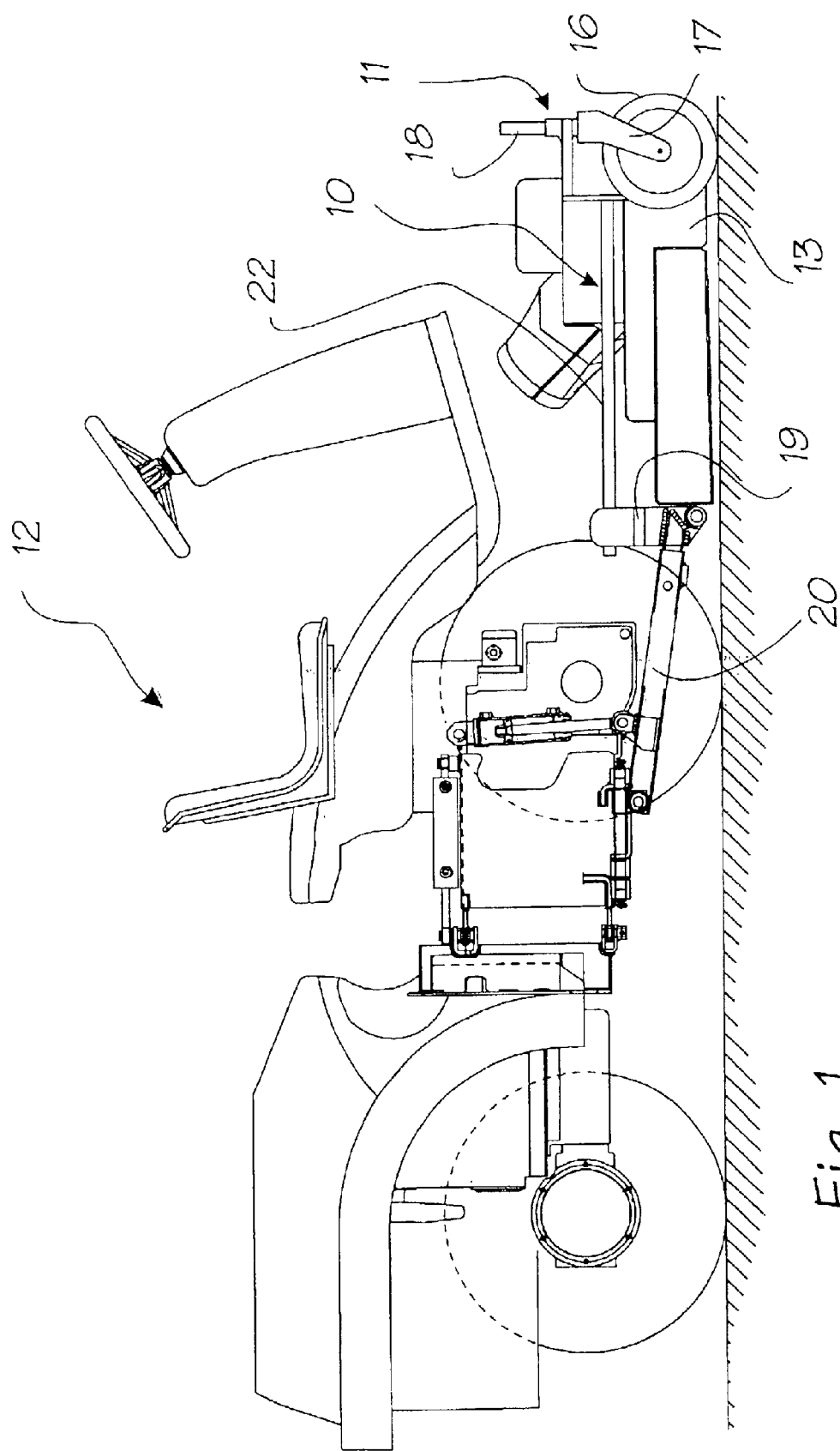
FIG. 1 is a partially sectional side view of a gardening vehicle that is provided, in a front region, with a tool such as a lawnmower, which is provided with an apparatus for height adjustment according to the invention.
Figure 2:
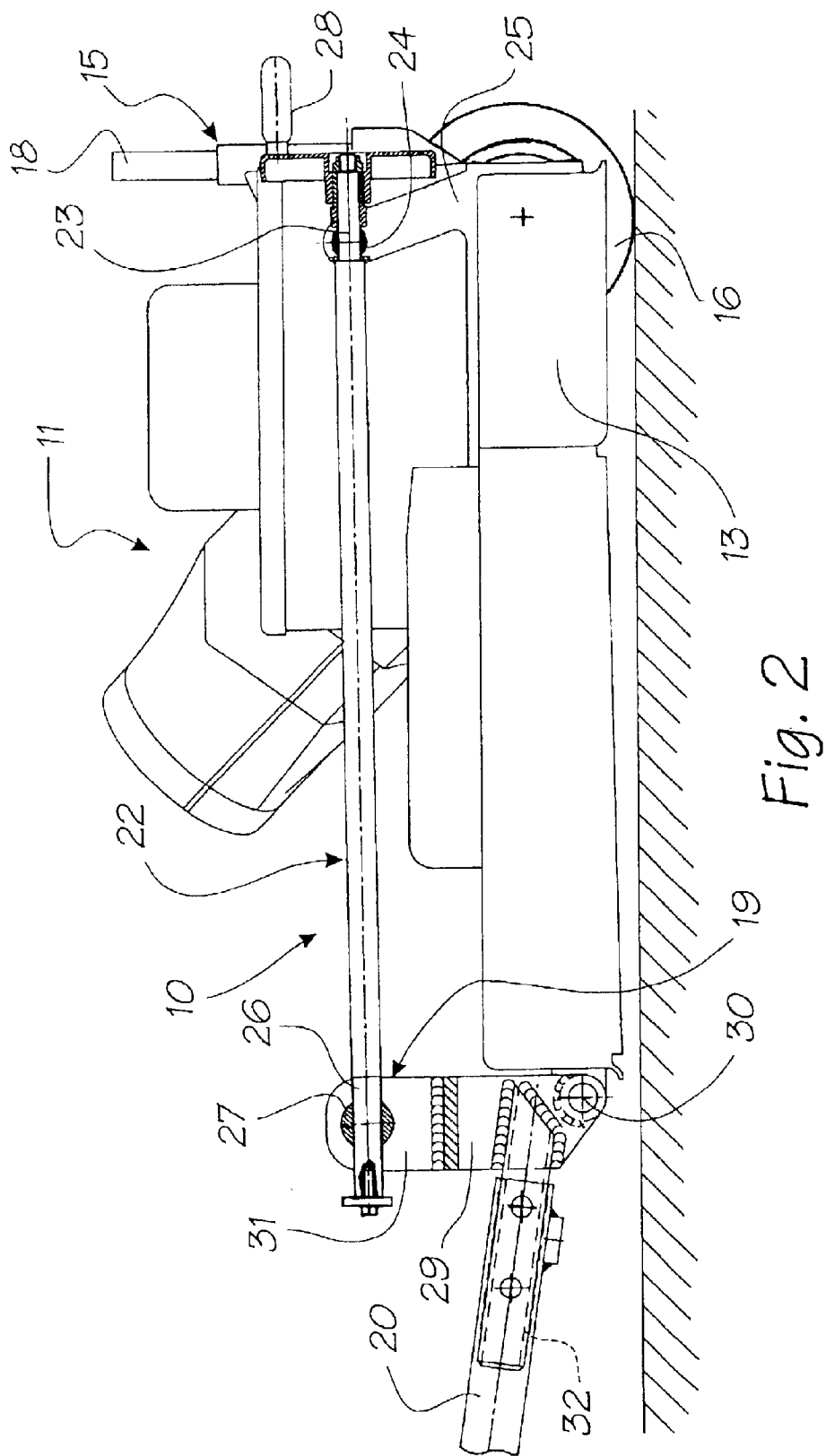
FIG. 2 is a partially sectional side view of a tool such as a lawnmower.
Figure 3:
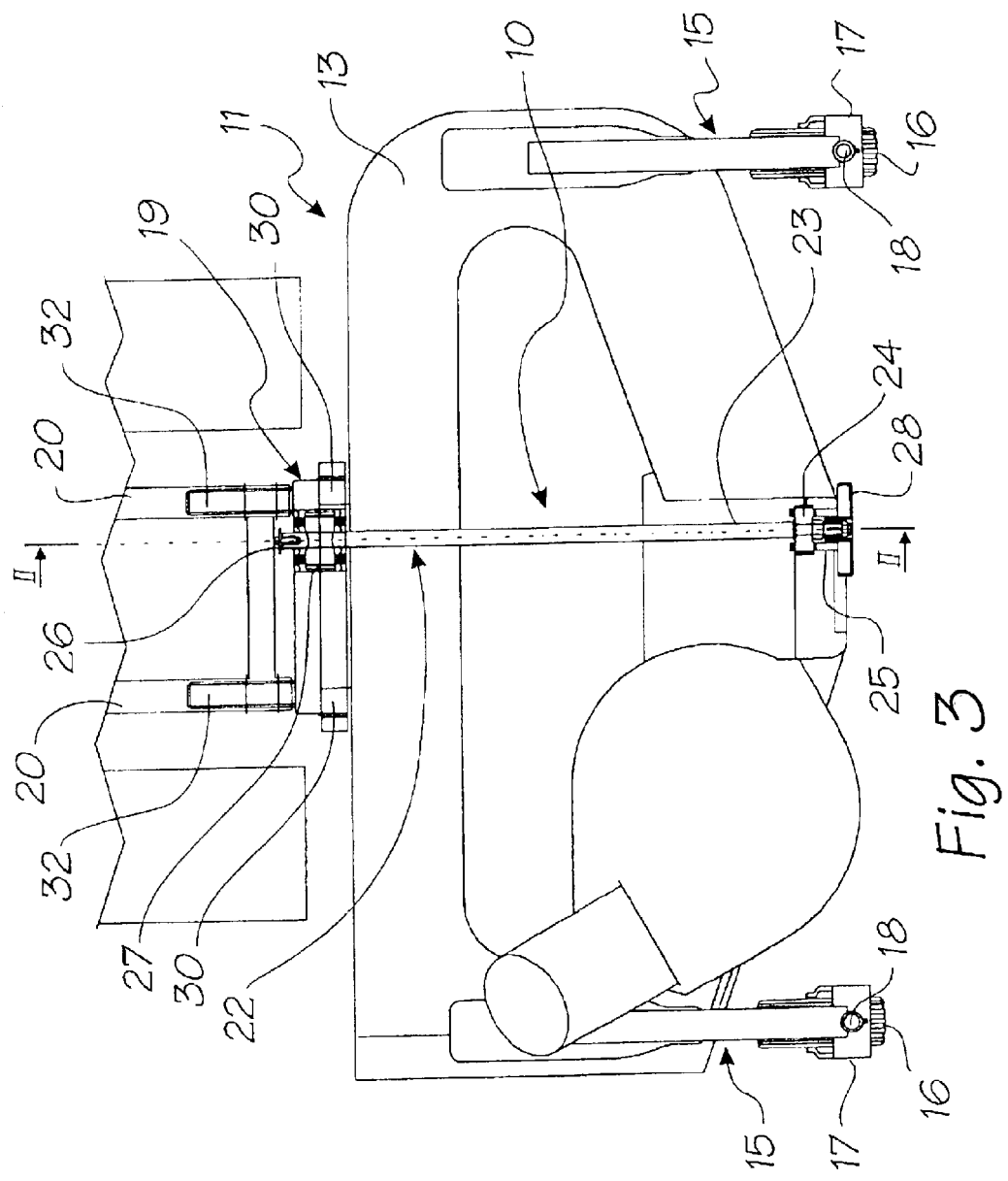
FIG. 3 is a partially sectional plan view of a tool such as a lawnmower.

With reference to the figures, an apparatus for adjusting the height of a tool such as a lawnmower or the like, particularly for gardening vehicles, is generally designated by the reference numeral 10.

The apparatus 10 is associated with a lawnmower tool 11, which is arranged in front of a gardening vehicle, generally designated by the reference numeral 12.

The lawnmower tool 11 comprises a protective housing 13, which acts as a chassis and supports, within its own dimensions, a plurality of motorized blades 14 that are arranged substantially horizontally.

At the front, the housing 13 is provided with monolithically coupled supports 15 for wheels 16 for advancing on the ground.

In particular, the wheels 16 are rotatably coupled to forks 17 that are rigidly coupled to substantially vertical stems 18, which slide on the tubular supports 15 and can be fixed thereon in a position whose height can be adjusted.

To the rear of the housing 13 there is a linkage 19, which is articulated to the housing 13 in a lower region.

Figure 4:
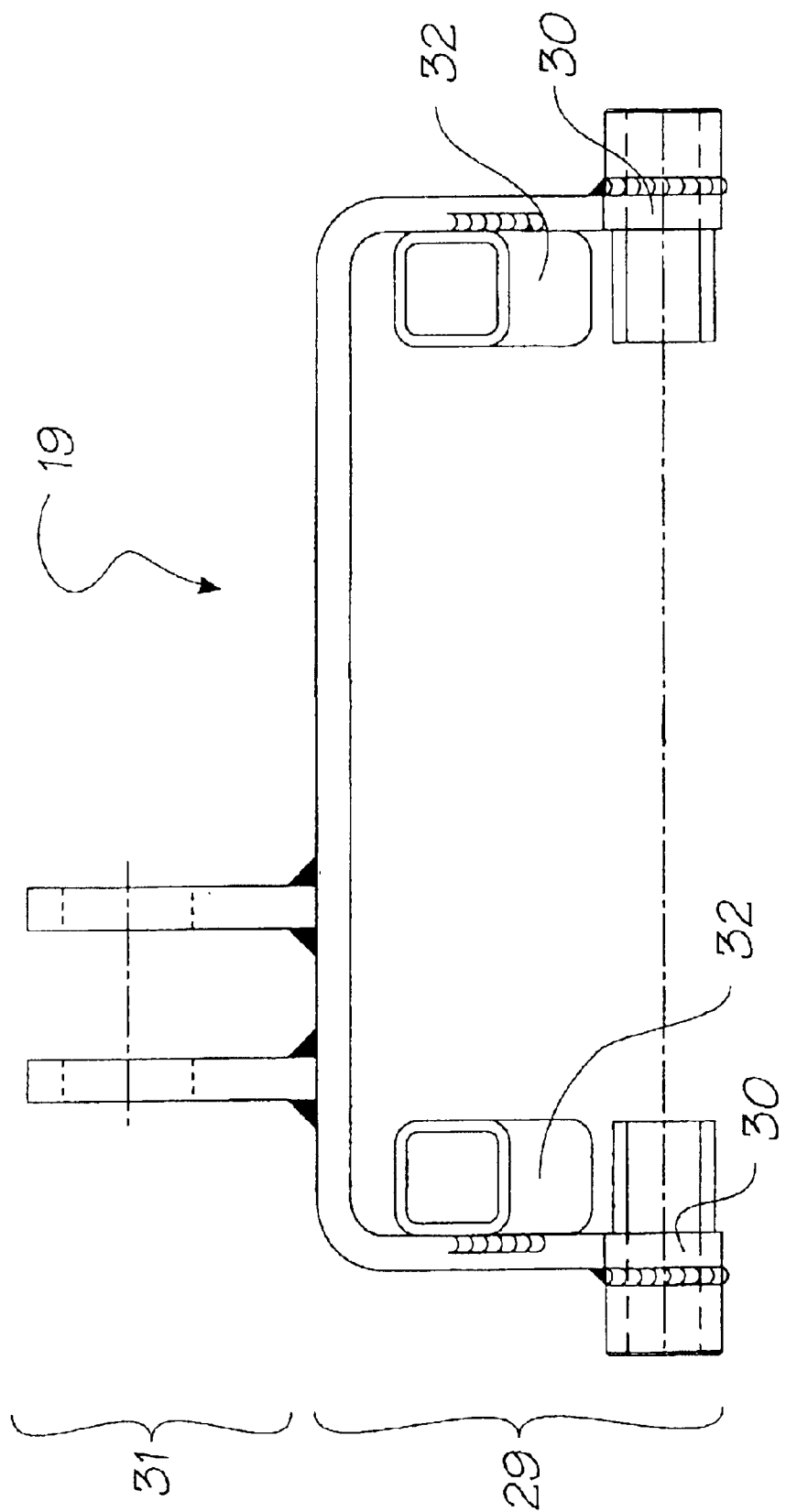
FIG. 4 is a view of a component of the apparatus according to the invention.
Figure 5:
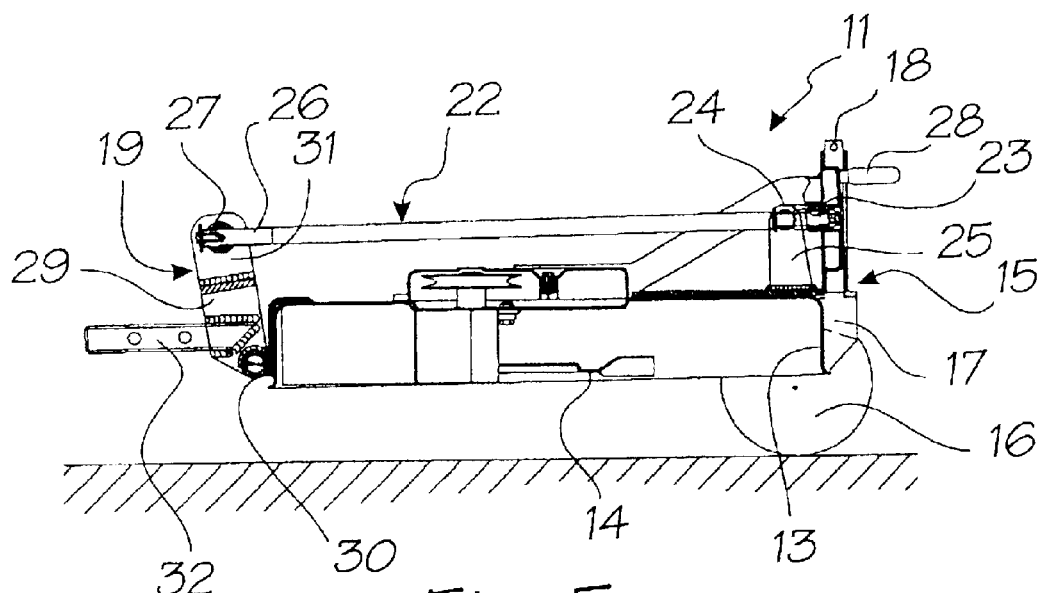
FIGS. 5 and 6 are partially sectional side views of a tool such as a lawnmower provided with an apparatus according to the invention in two different operating configurations.
Figure 6:
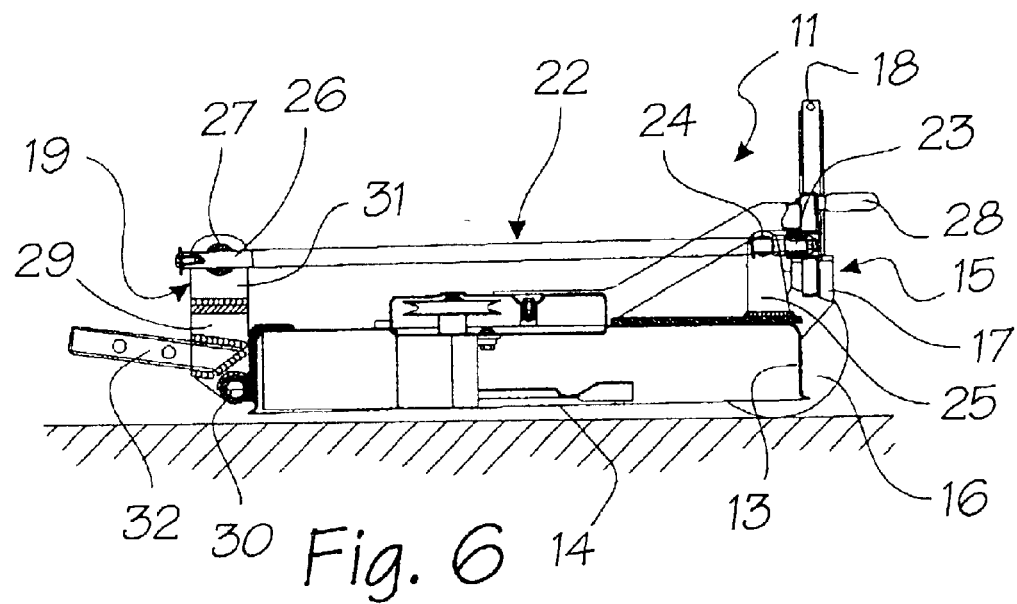

As shown in FIG. 4, the linkage 19 is constituted by a lower portion 29, which is shaped like an inverted U and has ends 30 that are articulated to the housing 13 about a substantially horizontal axis, and by an upper fork-shaped portion 31.

Two tubular elements 32 protrude, monolithically with respect to the linkage 19, from the lower portion 29, above the ends 30 and in the opposite direction with respect to the housing 13; the front ends of corresponding rod-like elements 20 engage on the tubular elements, such rod-like elements being also tubular and being mutually rigidly coupled and parallel, their rear ends being articulated in a lower region with respect to the chassis of the vehicle 12.

In practice, the rod-like elements 20 form a support for the rear portion of the housing 13.

Above the housing 13 there is a crank, generally designated by the reference numeral 22, which has a front end 23 that is rotatably coupled to a first cylindrical joint 24 arranged at the upper portion of an upright 25 that rises from the front portion of the housing 13, and a rear end 26 that engages, with a screw-and-nut coupling, on a second cylindrical joint 27, which is arranged above the upper portion 31 of the linkage 19.

At the front, the crank 22 is provided with a handwheel 28 that is available to the user and actuates the rotation of the crank about its own axis.

The crank 22 is arranged along the advancement direction of the tool 11 in a substantially central position of the tool.

In practice, the articulation points of the linkage 19 and of the crank 22 and the common axis of rotation of the wheels 16 provide the joints of an articulated quadrilateral constituted by the housing 13, the linkage 19, the crank 22 and the supports 15 of the wheels 16, in which the length of the crank 22 can be adjusted by the user.

By acting on the handwheel 28, the crank 22 is turned, consequently actuating the translational motion of the second cylindrical joint 27 along the rear end 26 of the crank 22.

In this manner, the linkage 19 rotates with respect to the axis of articulation to the housing 13 and, by cooperating with the rod-like elements 20, actuates the lowering or lifting of the rear portion of the housing 13 with respect to the ground.

Once a chosen height from the ground of the front portion of the housing 13 has been reached by adjusting the height of the wheels 16, to bring the housing 13 to a trim that is substantially horizontal to the ground, it is sufficient to compensate for the difference in level by acting on the handwheel 28, thus actuating the necessary lowering and/or lifting of the rear portion of the housing 13.

Advantageously, the crank 22 is provided, at the front, with a graduated scale, not shown in the figures for the sake of simplicity, which indicates the extent of the vertical movement imparted to the rear portion of the housing 13 as a function of the angular movement imparted to the crank 22, so as to know, on the basis of the height of the wheels 16, how much the crank 22 must be turned to bring the housing 13 to a trim in which it is substantially horizontal with respect to the ground.

In practice, it has been observed that the present invention has achieved the intended aim and objects.

An apparatus for adjusting the height of a tool such as a lawnmower or the like, particularly for gardening vehicles, has in fact been provided that has a simple structure and can be used easily and rapidly even by users lacking particular technical knowledge.

The apparatus has only two wheels (differently from current ones, which have four), and the height from the ground is adjusted by adjusting only the stems 18 of the wheels and by operating the handwheel 28.

The present invention is susceptible of numerous modifications and variations, all of which are within the scope of the same inventive concept.

The technical details can be replaced with other technically equivalent elements.

The materials, so long as they are compatible with the contingent use, as well as the dimensions, may be any according to requirements.

The disclosures in Italian Patent Application No. PD2001A000197 from which this application claims priority are incorporated herein by reference.

What is claimed is:

1. A lawnmower having an apparatus for adjusting the height of a lawnmower tool of said lawnmower which comprises front wheels whose height can be manually adjusted by a user on corresponding supports that are rigidly coupled to a front portion of protective housing suitable to form a chassis of said lawnmower tool, further comprising:

a rear linkage, which is articulated in a lower region to a rear portion of said protective housing of the lawnmower tool, a crank whose length can be manually adjusted by a user, said crank being arranged above the housing along the lawnmower advancement direction, with a front end that is articulated in an upper region to said front portion of said housing and a rear end that is articulated to an upper end of said rear linkage whereby said crank is manually rotatable by a user at said front portion of said housing about an axis extending in said lawnmower advancement direction upon manual adjustment thereof by the user;

said linkage being rigidly coupled to a support that is articulated to a chassis of said vehicle, articulation points of said linkage and said crank and a common axis of rotation of said wheels providing joints of an articulated quadrilateral constituted by said housing, said linkage, said crank and said supports, and such that the articulation connections of the front end of said crank to said front portion of said housing and of the rear end of said crank to said upper end of said rear linkage provide an articulated movement of said rear linkage to selectively raise and lower the height of said chassis of said lawnmower tool upon manual rotation adjustment of said crank whereby the height of said front wheels are separately manually adjustable.

2. The combination of claim 1, wherein said front end of said crank is connected with a first cylindrical joint that is arranged in front of said housing and above, and said rear end of said crank being positioned axially and in an adjustable manner on a second cylindrical joint that is arranged on the upper end of said linkage.

3. The combination of claim 2, wherein said front end of said crank being rotatably coupled to said first cylindrical joint on a front upright that rises from said housing, and said rear end of said crank engaging with a screw-and-nut coupling on said second cylindrical joint arranged on the upper end of said linkage.

4. The combination of claim 2, wherein said linkage comprises a lower portion that is shaped substantially like an inverted U, with ends that are articulated to the housing about a substantially horizontal axis, and an upper fork-shaped portion on which said second cylindrical joint is arranged.

5. The combination of claim 1, wherein said support is constituted by two rod-like elements that are mutually parallel and rigidly coupled and have front ends that are rigidly coupled to said linkage and rear ends that are articulated to said vehicle chassis in a lower region of said chassis.

6. The combination of claim 4, wherein two tubular elements protrude monolithically from said lower region of said linkage, above said ends for articulation to the housing in the opposite direction with respect to said housing, the front ends of said rod-like elements, which are in turn tubular, engaging on said tubular elements.

7. The combination of claim 1, wherein said crank is provided at a front with a handwheel that is available to the user.

8. The combination of claim 1, wherein said crank is arranged along said advancement direction of said lawnmower, in a substantially central position of said tool.

9. The combination of claim 1, wherein said crank has, at a front, a graduated scale that indicates the extent of the vertical movement imparted to the rear portion of said housing as a function of the angular movement imparted to the crank.

10. The combination of claim 1 wherein said housing is supported at said front portion thereof by said wheels and said housing is supported at said rear portion thereof exclusively by said support articulated to a chassis of said vehicle exclusive of any wheel support.

* * * * *